United States Patent
Garcia Teruel Y Herroz

(10) Patent No.: US 9,045,649 B2
(45) Date of Patent: Jun. 2, 2015

(54) STRUCTURED MINERAL MULTI-PIGMENT

(75) Inventor: Jorge Gerardo Garcia Teruel Y Herroz, Tlalnepantla (MX)

(73) Assignee: ATSA COMERCIAL S.A.DE.C.V., Tlalnepantla (MX)

( * ) Notice: Subject to any disclaimer, the term of this patent is extended or adjusted under 35 U.S.C. 154(b) by 0 days.

(21) Appl. No.: 13/997,089

(22) PCT Filed: Nov. 24, 2011

(86) PCT No.: PCT/MX2011/000145
§ 371 (c)(1),
(2), (4) Date: Nov. 12, 2013

(87) PCT Pub. No.: WO2012/087093
PCT Pub. Date: Jun. 28, 2012

(65) Prior Publication Data
US 2014/0158022 A1     Jun. 12, 2014

(30) Foreign Application Priority Data
Dec. 21, 2010  (MX) .................. MX/a/2010/014417

(51) Int. Cl.
*C09C 1/02* (2006.01)
*C09C 1/42* (2006.01)
*C09D 7/12* (2006.01)
*B82Y 30/00* (2011.01)
*C08K 3/00* (2006.01)
*C08K 3/26* (2006.01)

(52) U.S. Cl.
CPC ............ *C09D 7/1258* (2013.01); *B82Y 30/00* (2013.01); *C01P 2004/61* (2013.01); *C01P 2004/62* (2013.01); *C01P 2004/64* (2013.01); *C01P 2006/22* (2013.01); *C01P 2006/62* (2013.01); *C01P 2006/63* (2013.01); *C01P 2006/64* (2013.01); *C08K 3/0033* (2013.01); *C08K 3/26* (2013.01); *C09C 1/021* (2013.01); *C09C 1/42* (2013.01); *C01P 2004/51* (2013.01)

(58) Field of Classification Search
CPC ......... C01B 33/26; C01F 11/18; C09C 1/021; C09C 1/42; C09D 7/1258; C08K 3/0033; C08K 3/26; C01P 2004/61; C01P 2004/62; C01P 2004/64; C01P 2006/22; C01P 2006/62; C01P 2006/63; C01P 2006/64; B82Y 30/00
USPC .................................................. 106/464, 465
See application file for complete search history.

(56) References Cited

U.S. PATENT DOCUMENTS 5,676,747 A    10/1997   Brown
6,758,895 B2    7/2004   Wesley

FOREIGN PATENT DOCUMENTS

EP            1995284        11/2008
WO         WO02/44286         6/2002
WO       WO2010/143068       12/2010

OTHER PUBLICATIONS

PCT Application PCT/MX2011/000145; Search Report Mailed Mar. 21, 2012; Jorge Gerardo Garcia Teruel Y Herroz.

*Primary Examiner* — Anthony J Green
(74) *Attorney, Agent, or Firm* — Thorpe North & Western, LLP

(57) ABSTRACT

The present invention is related to the industry of coatings and more specifically to the industry that manufactures bases for paints and even more specifically, to the industry that manufactures inorganic material bases. Our invention has, with respect to the current state of the art, the following advantages: coating characteristics, improved coloring and whiteness capacity which allow for adequate handling of the same even with a large concentration of solids, made of less costly materials. Said composition is characterized by consisting in its composition of kaolin with the following distribution of particle size: between 88 and 98% of the particles should be smaller than 2 microns and only between 10 and 30% should be smaller than 0.2 microns; and of calcium carbonate with a distribution of particle size of between 88 and 96% of the particles smaller than 2 microns and between 4 and 14% smaller than 0.2 microns.

8 Claims, No Drawings

STRUCTURED MINERAL MULTI-PIGMENT

FIELD OF THE INVENTION

The present invention is related to the industry where a white pigment is required. For example in the industry that manufactures paints, coatings in general and the casting of ceramic and plastic pieces and in the production of paper and cardboard.

BACKGROUND OF THE INVENTION

It is a well-known fact that minerals have been widely used in the production of paper coatings, fillers and paints, just to mention a few. It is often the case that aqueous dispersions with a high content of solids are preferred, this brings with it high viscosity and consequently handling problems.

Dispersion of two or more components of distinct structure creates technical problems that must be resolved in order to manufacture the product containing the components, achieving the optimum packaging of said particles.

In order to improve viscosity and facilitate handling and processing, for example grinding, when working with a high content of solids, dispersants are usually added to the slurries. There are many dispersants that exist in the state of the art. They may be for example anionic polymers, such as neutralized polyacrylates of various salts. However, not all kinds of polyacrylates work ideally with distinct compositions. This proves there is a need to develop aqueous dispersions from minerals with a high content of solids using reduced amounts of polyacrylates.

Also, due to the role these products play, in most of their applications, it is important that they comply highly with respect to their capacity to cover, of whiteness and color (coloring capacity).

Another important aspect is the price of the components of the product. The characteristics of coverage, color and coloring capacity may be satisfactory using titanium dioxide, with very good results; however, the cost of this component increases the price of the product too much, thus making it necessary to find partial substitutes (extenders).

These are the gaps that organic and inorganic material mineral compositions present in the state of the art.

Existing calcium carbonates and kaolin, in any presentation, are basically pigment fillers or extenders which are used, for example, in the paint industry, basically to decrease costs, and do not provide the same physical characteristics and optical properties as pigments with structured minerals, such as: coverage, whiteness, gloss and coloring capacity.

With a view of achieving the characteristics indicated in the previous paragraph, exploration was begun into the size of existing carbonate and kaolin particles, making important progress as presented in U.S. Pat. No. 5,676,747, in which the granulometric structure of calcium carbonate which achieves the desired characteristics of coating ability is indicated.

OBJECTIVES OF THE INVENTION

One of the objectives of the present invention is to achieve a non-metallic mineral composition, paint base or base for other coatings, with superior characteristics of coverage capacity, coloring capacity, whiteness and gloss.

Another objective, in one of its variations, is to achieve an aqueous dispersion, paint base with a viscosity that allows adequate handling of the same, even with a high concentration of solids.

Still another objective is to achieve said composition at low cost.

Other objectives and advantages of the present invention will become apparent through studying the following description and examples annexed to the present application, which are exclusively illustrative and in no way limiting.

SUMMARY OF THE INVENTION

The present invention consists of a non-metallic mineral composition to be used as a paint base, coatings or fillers whose most important solids are made up of Kaolin and Calcium Carbonate, but with the characteristic of at least one of these having more than 90% of its particle size of less than 2 microns.

In other words, the aqueous dispersion which is the object of the present invention is a combination of calcium carbonate and kaolin in an aqueous suspension (slurry) which is physically and chemically structured to optimize and/or modify the index of light refraction and improve the optic properties of coverage, whiteness and to confer coloring capacity to paints.

This aqueous dispersion imparts properties of excellent coverage, whiteness and coloring capacity to paints in which it is contained. These are aqueous dispersions of calcium carbonate and kaolin with distinct granulometric, crystallographic and rheological characteristics, which use different additives, which are sold separately and which the user combines with his formulations depending on his needs.

The compositions that are the object of the present description, which is the invention to be protected by means of the present application, on the whole has the following characteristics and composition range:

| | |
|---|---|
| % SOLIDS | >60 |
| Brookfield VISCOSITY | 200-1,000 CPS (100 rpm needle #4) |
| pH | 8-9.5 |
| % AVERAGE SIZE | <1 MICRON |
| WHITENESS X-RITE | 92-96 (°G.E. 460 nm) |
| TONE | |
| $L^*$ | 96-99 |
| $a^*$ | 0-1.0 |
| $b^*$ | 1.0-3.0 |
| RET. 325 SIEVE | 500 PPM max |
| COLORING CAPACITY | |
| $\Delta L^*$ | 1.5/−0.5 |
| $\Delta a^*$ | 1/−1 |
| $\Delta b^*$ | 1.3/−1.3 |

To achieve these qualities, the components that make up this composition are:

| CALCIUM CARBONATE AQUEOUS DISPERSION | |
|---|---|
| % SOLIDS | >60 |
| VISCOSITY | 200-1,000 cps 100 rpm needle #4 |
| pH | 8-10.5 |
| % PARTICLE SIZE <2 MICRONS | 90-94 |
| WHITENESS | 93-98 °G.E. |
| TONE | |
| $L^*$ | 98-99 |
| $a^*$ | 0.3-0.5 |
| $b^*$ | 1.0-1.4 |
| RET. SIEVE 325 | 100-500 ppm max |
| RET. SIEVE 625 | 100-800 ppm max |

The other component is the following:

| STRUCTURED KAOLIN AQUEOUS DISPERSION | |
|---|---|
| % SOLIDS | >60 |
| VISCOSITY | 200-800 CPS |
| pH | 7-8 |
| % PARTICLE SIZE <2 MICRONS | 88-96 |
| WHITENESS | 88 min °G.E. |
| TONE | |
| L* | 96.5-97.5 |
| a* | 0.2-0.4 |
| b* | 1.9-2.4 |
| RET. SIEVE 325 | 0.15% MAX |

From the point of view of the structuring of the particle size, after a number of trials, it was deduced that in order to indicate that kaolin is structured, the size of the particles which it presents should have the following distribution: from 88 to 98% of the particles should be smaller than 2 microns and only 20 to 30% should be smaller than 0.2 microns.

This is interesting since the size of non-structured kaolin can be anywhere from sand-sized to nanoparticles.

With respect to structured calcium carbonate, it has a particle size distribution with 80 to 98% of its particles being smaller than 2 microns and 4 to 14% being smaller than 0.2 microns.

Structured kaolin and calcium carbonate are the raw materials for the composition that is the object of the present invention. Once these components are described, we will be able to say that our multi-pigment consists of a synergic combination of these two components.

This combination is such that between 88 and 98% of the particles of the combination of kaolin and calcium carbonate are smaller than 2 microns and preferably, 90 to 94% are this size.

On the other hand, only between 8 and 20 percent, more specifically between 10 and 18 percent, of the particles are smaller than 0.2 microns.

In other words, the multi-pigment which is the object of the present invention has a composition of between 80 and 90% and preferably between 82 and 88 percent structured calcium carbonate as stated before and between 10 and 20% and preferably between 12 and 18% structured kaolin as described above.

Tests that were carried out show that if the particle size of the components is outside the established range, light dispersion capacity is reduced when the proportion of larger sized to ultra-small size increases, thus less coating ability is obtained.

When the particle size is greater than the established range, optimal capacity of light dispersion is not reached, the same coating ability is not obtained, and proper whiteness is not obtained.

The pH of this composition should be alkaline, preferably between 7 and 10 and more specifically between 8 and 9.

In order to better understand the invention, we will now present a detailed description of some of the forms of the invention, shown by the annexed examples that are illustrative, but non-limiting.

DETAILED DESCRIPTION OF THE INVENTION

In order to attain the objectives presented in the present invention, multiple tests were carried out, with the intention of finding the appropriate characteristics of the components of the formula, in order to achieve the final product as an aqueous dispersion paint base or other coating.

The aqueous dispersion, used as a base for paint or other coatings, which is the object of the present invention is a combination of calcium carbonate and kaolin in an aqueous suspension (slurry) which is physically and chemically structured to optimize and/or modify the index of light refraction and improve the optical properties of coverage, whiteness and to confer coloring capacity to paints.

This dispersion confers properties of coverage and whiteness, as well as coloring capacity to paints in which it is used. This product, which acts as a pigment, not only decreases the cost of paint formulations, but also increases quality.

Washed calcium carbonate and kaolin undergo a structuring process in which a particle size distribution of <2 microns is achieved in at least 90% of the product that may be verified with the particle size analyzing equipment Sedigraph®.

In greater detail, from the structural point of view of particle size, following various trials, it was deduced that in order to assume that kaolin is structured, the particle size present should be the following: between 88 and 98% of the particles smaller than 2 microns and only between 10 and 30% smaller than 0.2 microns.

In the case of structured calcium carbonate the particle distribution should be the following: between 90 and 98% of the particles smaller than 2 microns and between 4 and 14% smaller than 0.2 microns.

Structured kaolin and carbonate are the raw materials for the composition that is the object of the present invention. Once the components have been described, it may be said that our multi-pigment consists of a synergic combination of the two.

This combination is such that between 88 and 96% of the particles of the combination of kaolin and calcium carbonate are smaller than 2 microns and preferably, between 88 and 94 percent of the particles is this size.

On the other hand, only between 8 and 20 percent, and preferably between 10 and 18 percent of the particles are smaller than 0.2 microns.

The process for obtaining these materials requires that solids make up 60 to 74 percent of the concentration.

Afterwards this concentrate is homogenized with a dispersant in order to adjust to the specified viscosity.

This process is similar for calcium carbonate and for kaolin and latter the dispersions are combined.

The viscosity of this combination is adjusted to the required level, with the proper proportion of dispersant.

As is well known, dispersions of kaolin and calcium carbonate tend to decompose due to bacterial contamination, and so a bactericide is added, in this case benzyl-isothiazolinone at 1000 to 5000 ppm.

In order to stabilize the viscosity of the product, between 0.5 and 1% pH regulator is added, this being ammonia, amine or a derivative, such as methyl aminopropanol.

EXAMPLES

Example 1

Proportion of Kaolin-Calcium Carbonate

In order to determine the correct proportion of kaolin to calcium carbonate, different proportions were tested, with the results are shown in Table 1.

TABLE I

EVALUATION OF THE DISPERSION WITH DIFFERENT PROPORTIONS OF KAOLIN

|  | 1 | 2 | 3 | 4 | 5 |
|---|---|---|---|---|---|
| % Structured Calcium Carbonate | 90 | 83 | 80 | 70 | 60 |
| % Structured Kaolin | 10 | 17 | 20 | 30 | 40 |
| % Solids | 61.76% | 61.53% | 61.79% | 61.53% | 61.98% |
| pH | 8.52 | 8.47 | 8.47 | 8.34 | 8.25 |
| Visc. Cps | 520 | 500 | 520 | 480 | 500 |
| Opacity | 80.9 | 81.37 | 81.37 | 81.8 | 83 |
| Whiteness | 90.14 | 89.39 | 89.22 | 88.27 | 87.23 |
| L | 96.62 | 96.36 | 96.26 | 96.1 | 95.85 |
| A | −0.12 | −0.09 | −0.11 | −0.09 | −0.1 |
| Coloring Capacity | 14.44 | 14.64 | 13.47 | 13.64 | 13.58 |

It will be clear to professionals in the industrial sector of our competition, that it was important to determine the procedures which would allow for measuring the levels of the parameters which we indicate and which improve the present invention.

Procedure for Verifying Coverability and Whiteness

The procedure for determining coverability and whiteness of structured multi-pigments consists of applying a moist film of a combination 80/20 on a transparent acetate with a thickness of say 0.007", with a compatible resin, letting it dry and measuring the opacity in an X-rite densitometer and measuring the whiteness in an X-rite colorimeter at 460 nm.

Procedure for Verifying Color and Coloring Capacity

With this procedure the color and coloring capability is determined in an X-rite Colorimeter. In this process structured multi-pigment is colored with blue dye and it is then applied to a white leneta chart, applied 0.007" moist thickness, allowed to dry and read with a colorimeter, and the reading is compared to the previously prepared standard.

Example 2

Proper Particle Size

One of the parameters that defines our product is its being structured, and this has to do with the particle size, and more specifically with the proportion of these sizes, since particles that are too small have an adverse effect on some of the characteristics of the final product, and particles that are too large have other adverse effects.

In order to test the effect of particle size of the two important elements of the composition we are planning on protecting, that is to say, of kaolin and calcium carbonate, a series of tests was carried out, the same are shown in the following table.

NON-STRUCTURED KAOLIN AND CARBONATE VS ATSACOVER ® HW

|  | ATSACOVER ® HW | KAOLIN 2 | KAOLIN 1 HIGH WHITENESS | CALCIUM CARBONATE 1.5 MICRONS | CALCIUM CARBONATE 11 MICRONS |
|---|---|---|---|---|---|
| % FINENESS 5μ | 99.20 | 59.50 | 93.90 | 94.44 | 21.40 |
| AVE. DIAM. | 0.64 | 3.439 | 0.606 | 1.55 | 11.59 |
| WHITENESS | 94.4 | 86.56 | 90.76 | 95.5 | 89.75 |
| OPACITY | 80.04 | 77.61 | 68.37 | 67.64 | 35.43 |
| L* | 96.63 | 91.81 | 93.14 | 95.08 | 91.05 |
| a* | 0 | 0.46 | −0.15 | −0.05 | −0.48 |
| b* | 1.64 | 4.3 | 2.25 | 1.94 | 4.88 |
| COLORING CAPACITY |  |  |  |  |  |
| L* | 78.03 | 70.59 | 70 | 70.33 | 59.07 |

OPACITY MEASURED WITH AN X-RITE 361T DENSITOMETER
WHITENESS MEASURED WITH AN X-RITE ELECTROPHOTOMETER
COLORING CAPACITY MEASURED WITH AN X-RITE ELECTROPHOTOMETER

In order to define the composition that we are planning to protect, we will now define the two principle products, structured kaolin and calcium carbonate, having the following characteristics:

| CALCIUM CARBONATE AQUEOUS DISPERSION | |
|---|---|
| % SOLIDS | >60 |
| VISCOSITY | 200-800 cps 100 rpm need #4 |
| PH | 8-10.5 |
| % PARTICLE SIZE <2 MICRONS | 90-94 |
| WHITENESS | 94-96 °G.E. |
| TONE | |
| L* | 98-99 |
| a* | 0.3-0.5 |
| b* | 1.0-1.4 |
| RET. SIEVE 325 | 100-500 ppm max |
| RET. SIEVE 625 | 100-800 ppm max | and kaolin:

| STRUCTURED KAOLIN AQUEOUS DISPERSION | |
|---|---|
| % SOLIDS | >60 |
| DENSITY | 1.57 |

-continued

| STRUCTURED KAOLIN AQUEOUS DISPERSION | |
|---|---|
| VISCOSITY | 200-800 CPS |
| pH | 7-8 |
| % PARTICLE SIZE <2 MICRONS | 88-96 |
| WHITENESS | 88 min °G.E. |
| TONE | |
| L* | 96.5-97.5 |
| a* | 0.2-0.4 |
| b* | 1.9-2.4 |
| RET. SIEVE 325 | 0.15% MAX |

After carrying out the tests and giving the results, which are shown in Table 1, the proper proportion of calcium carbonate and kaolin was determined:

| CALCIUM CARBONATE | 82-84% |
|---|---|
| STRUCTURED KAOLIN | 16-18% |

In order to obtain the distribution of optimum particle size, calcium carbonate and kaolin are structured by means of a dispersion, classification and grinding process. Through said process excellent properties of coating ability, whiteness, gloss and coloring capacity are also obtained.

In order to obtain a product with a high concentration of solids and low viscosity, which give us an advantage in use and handling of the product, research was developed to obtain proper dispersants as well as the relation of use. With all this work it was discovered that the dispersant ammonium polyacrylate in combination with the dispersant sodium polyacrylate in a proportion of 70/30 is the best option for giving the properties of viscosity and coloring capacity.

| AMMONIUM POLYACRYLATE DISPERSANT | |
|---|---|
| APPEARANCE | PALE MILKY LIQUID |
| pH at 25° C. | 7-9 |
| VISCOSITY at 25° C. | 2.5-5.5 CS |
| % ACTIVE SUBS. | 37.5-40.5 |

| SODIUM POLYACRYLATE DISPERSANT | |
|---|---|
| APPEARANCE | LIGHT YELLOW LIQUID |
| pH at 25° C. | 10.5 MAX |
| DENSITY at 25° C. | 1.15-1.36 |
| % SOLIDS | 40-43 |

In order to obtain a stable product with respect to bacteriological contamination, a series of products were investigated, of which the best bacteriological protection was given to the structured multi-pigment by benzyl-isothiazolinone, added at 1,000 to 3,000 ppm with which longer shelf life is guaranteed.

Finally, pH is controlled by:

| METHYL AMINOPROPANOL (pH REGULATOR) | |
|---|---|
| % WATER (KARL-FISHER) | 4.8-5.8 |
| APHA COLOR | 0-20 |
| SPECIFIC GRAVITY | 0.938-0.9465 |
| NEUTRAL EQ. | 93-97 |

In order to obtain better coating capacity, whiteness and coloring capacity, after elaborating a series of tests at different concentrations of calcium carbonate and kaolin, it was found that the proportion 83/17, under the conditions at which the tests were carried out, was the optimum combination and that it guaranteed the best product behavior. With other raw materials, the combination may vary.

Therefore, in general the composition of the product to be protected is:

| PRODUCT | AMOUNT |
|---|---|
| Structured CaCO$_3$ | 82-84% |
| Structured Kaolin | 16-18% |
| Biocide | 1000-2000 ppm |
| Amine | 0.5-0.1% |
| Dispersant (COMBINATION 70/30) | 1.0-2.0% | and an optimum composition would be:

| PRODUCT | AMOUNT |
|---|---|
| Structured CaCO$_3$ | 83% |
| Structured Kaolin | 17% |
| Biocide | 1000-2000 ppm |
| Amine | 0.5-0.1% |
| Dispersant (COMBINATION 70/30) | 1.0-2.0% |

In other words, the composition of the multi-pigment which is the object of the present invention is between 80 and 90%, preferably between 82 and 88% structured calcium carbonate as indicated earlier, and between 10 and 20%, preferably between 12 and 18% structured kaolin, as described earlier.

The tests conducted indicate that if the particle size of the components is finer than established ranges, the capacity of light dispersion is reduced upon increasing the proportion of ultra-fine particles, thus less coating ability is achieved.

Contrary to this, if the particle size is larger than established ranges, optimal opacity is not reached, good coating ability is not attained, and proper whiteness is not reached.

The pH of this composition should be alkaline, preferably between 7 and 10 and more specifically between 8 and 9.

After establishing the exact composition of the major elements, that is calcium carbonate and kaolin, we proceeded to determine what component would reduce viscosity of the product in order to handle it easier and latter to determine the biocide which would prevent microbial decomposition of the coating composition.

The invention has been sufficiently described so that a person with knowledge of the field can reproduce and obtain the results we mention for the present invention. However, anyone with knowledge of the field of the present invention is capable of making modifications not described in the present application, and if, for the application of these modifications in the determined structure or manufacturing process it is necessary to use the material claimed in the following claims, said structure should be considered within the scope of the invention.

The invention claimed is:

1. A mineral composition base for paints and coatings, characterized by having in its composition kaolin with particle size distribution as follows: between 88 and 98% are smaller than 2 microns and only between 10 and 30% are smaller than 0.2 microns; and calcium carbonate with particle size distribution as follows: between 90 and 98% are smaller than 2 microns and between 6 and 14% are smaller than 0.2 microns.

2. A mineral composition base for paints and coatings, as claimed in claim 1, also characterized by in that said kaolin and said carbonate are in a ratio between 1:9 and 2:8.

3. A mineral composition base for paints and coatings, as claimed in claim 1, also characterized in that said kaolin and said carbonate are in a ratio between 1.2:8.8 and 1.8:8.2.

4. A mineral composition base for paints and coatings, as claimed in claim 1, also characterized by the kaolin particle size distribution being between 88 and 98% smaller than 2.0 microns and between 10 and 20% smaller than 0.2 microns.

5. A mineral composition base for paints and coatings, as claimed in claim 1, also characterized by the kaolin particle size distribution being between 89 and 93% smaller than 2.0 microns and between 10 and 18% smaller than 0.2 microns.

6. A mineral composition base for paints and coatings, as claimed in claim 1, characterized by having a pH stabilizer in a percentage of between 0.1 and 0.5%.

7. A mineral composition base for paints and coatings, as claimed in claim 6, characterized by having methyl aminopropinol as the pH stabilizer in a percentage of between 0.1 and 0.5%.

8. A mineral composition base for paints and coatings, as claimed in claim 1, characterized by having the following composition:

| PRODUCT | AMOUNT |
|---|---|
| Structured $CaCO_3$ | 83% |
| Structured Kaolin | 17% |
| Biocide | 1000-3000 ppm |
| Amine | 0.1-0.5% |
| Dispersant (Ammonium polyacrylate: sodium polyacrylate 70/30) | 0.5-1.5%. |

* * * * *